United States Patent
Kim et al.

(10) Patent No.: US 10,246,799 B2
(45) Date of Patent: Apr. 2, 2019

(54) POLYLACTIC ACID RESIN COMPOSITION FOR 3D PRINTING

(71) Applicant: SK CHEMICALS CO., LTD., Seongnam-si, Gyeonggi-do (KR)

(72) Inventors: Min-young Kim, Seoul (KR); Jong Ryang Kim, Seongnam-si (KR); Tae-Young Kim, Suwon-si (KR); Sung-wan Jeon, Hanam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 208 days.

(21) Appl. No.: 15/504,286

(22) PCT Filed: Aug. 21, 2015

(86) PCT No.: PCT/KR2015/008762
§ 371 (c)(1),
(2) Date: Feb. 15, 2017

(87) PCT Pub. No.: WO2016/043440
PCT Pub. Date: Mar. 24, 2016

(65) Prior Publication Data
US 2017/0233899 A1 Aug. 17, 2017

(30) Foreign Application Priority Data

Sep. 17, 2014 (KR) .................. 10-2014-0123892

(51) Int. Cl.
| | | |
|---|---|---|
| C08G 63/02 | (2006.01) | |
| D01F 6/70 | (2006.01) | |
| C08G 63/08 | (2006.01) | |
| C08G 71/04 | (2006.01) | |
| C08G 18/48 | (2006.01) | |
| B33Y 10/00 | (2015.01) | |
| B33Y 70/00 | (2015.01) | |
| C08G 18/10 | (2006.01) | |
| C08G 18/73 | (2006.01) | |
| C08G 18/83 | (2006.01) | |
| C08G 63/06 | (2006.01) | |
| C08G 18/24 | (2006.01) | |
| C08G 18/34 | (2006.01) | |
| C08G 18/42 | (2006.01) | |
| B29C 64/106 | (2017.01) | |
| B29K 67/00 | (2006.01) | |

(52) U.S. Cl.
CPC .............. *D01F 6/70* (2013.01); *B29C 64/106* (2017.08); *B33Y 10/00* (2014.12); *B33Y 70/00* (2014.12); *C08G 18/10* (2013.01); *C08G 18/246* (2013.01); *C08G 18/348* (2013.01); *C08G 18/428* (2013.01); *C08G 18/48* (2013.01); *C08G 18/4825* (2013.01); *C08G 18/73* (2013.01); *C08G 18/831* (2013.01); *C08G 63/06* (2013.01); *C08G 63/08* (2013.01); *C08G 71/04* (2013.01); *B29K 2067/046* (2013.01)

(58) Field of Classification Search
USPC .................................................. 528/272, 271
See application file for complete search history.

(56) References Cited

U.S. PATENT DOCUMENTS

| | | | |
|---|---|---|---|
| 8,827,684 B1 * | 9/2014 | Schumacher | B29C 64/20 264/308 X |
| 2005/0281856 A1 | 12/2005 | McGlohorn et al. | |
| 2006/0051394 A1 | 3/2006 | Moore et al. | 424/423 |
| 2009/0099600 A1 | 4/2009 | Moore et al. | 606/246 |
| 2010/0323575 A1 | 12/2010 | He et al. | 442/400 |
| 2014/0004330 A1 | 1/2014 | Yoo et al. | 428/220 |
| 2014/0302297 A1 | 10/2014 | Yoo et al. | |

FOREIGN PATENT DOCUMENTS

| | | | |
|---|---|---|---|
| CN | 103077489 | 5/2013 | .............. G06Q 50/14 |
| CN | 103146164 | 6/2013 | .............. C08L 67/04 |
| CN | 103261264 A | 8/2013 | |
| CN | 103467950 | 12/2013 | .............. C08L 67/04 |
| KR | 10-2010-0098529 | 9/2010 | .............. D01F 6/78 |
| KR | 10-2012-0049102 | 5/2012 | .............. C08G 63/08 |
| KR | 10-2014-0071747 | 6/2014 | .............. C08L 67/02 |

OTHER PUBLICATIONS

Office Action from corresponding Taiwanese Patent Application No. 10412879, dated Dec. 3, 2018.
International Search Report (ISR) dated Sep. 30, 2015 in PCT/KR2015/008762 published as WO 2016/043440 with English Translation.
Written Opinion (WO) dated Sep. 30, 2015 in PCT/KR2015/008762, published as WO 2016/043440 (no English translation available).
Extended Search Report issued to the corresponding European Patent Application No. 15842012.5 dated Mar. 27, 2018.

\* cited by examiner

*Primary Examiner* — Terressa Boykin
(74) *Attorney, Agent, or Firm* — Harness, Dickey & Pierce, P.L.C.

(57) ABSTRACT

A polylactic acid resin composition, which comprises: a hard segment containing a polylactic acid repeat unit; and a soft segment containing a polyurethane polyol repeat unit in which polyether-based polyol repeat units are linearly connected to each other via a urethane linkage, can be processed at low temperatures and at high rates, has a high solidification rate, and is eco-friendly, due to a low melting point thereof, and thus is useful for 3D printing.

8 Claims, No Drawings

POLYLACTIC ACID RESIN COMPOSITION FOR 3D PRINTING

CROSS-REFERENCE TO RELATED APPLICATIONS

This application is a national phase application of PCT Application No. PCT/KR2015/008762, filed on Aug. 21, 2015, which claims the benefit and priority of Korean Patent Application No. 10-2014-0123892, filed Sep. 17, 2014. The entire disclosures of the applications identified in this paragraph are incorporated herein by reference.

FIELD

The present invention relates to a polylactic acid resin composition for three-dimensional (3D) printing, which has not only a lower melting temperature than those of conventional polylactic acid resin compositions, to thereby undergo low-temperature and high-speed processing, but also a high solidification rate and eco-friendly characteristics.

BACKGROUND ART

Three-dimensional (3D) printing refers to a way of forming a stereoscopic object, as compared with the conventional two-dimensional (2D) (i.e., planar) printing technique to draw an image on the surface of a paper or an object. In 3D printing, an object is fabricated by printing an ink serving as a raw material for constituting the object in a desired shape through computer-aided design (CAD). 3D printing is primarily used for prompt preparation of prototypes in order to curtail time and expenses required for the preparation of such prototypes. Therefore, 3D printing can be employed in various areas such as personal products, medical products, automobile parts, construction products, or the like.

3D printing may be classified into a laser-based method such as stereolithography (SLA), selective laser sintering (SLS), and UV inkjet mode, and a non-laser-based method such as transit development plan (TDP), fused deposition modeling (FDM), etc.

3D printing materials used in manufacturing an object by the 3D printing technique are diverse and may include, for example, thermoplastic plastics, metals, paper, nylon, rubber, resins, wood, sand, ceramics, or the like. FDM is the most widely used 3D printing method wherein a thermoplastic resin is melted and extruded to form an object. Raw materials commonly used in the FDM method may include, for example, acrylonitrile butadiene styrene (ABS), polylactic acid (PLA), or the like.

As one of the major materials, ABS is an engineering plastic having good mechanical properties such as toughness and may be applicable in various ways in the 3D printing field. However, it involves disadvantages that it has high melting temperatures, suffers deformation (e.g., shrinkage) in shape during a process, and generates noxious gas; hence, it is not proper for working in an office or a studio.

Recently, PLA resins have attracted attention as a 3D printing material since they are not toxic when they are processed, have relatively low melting temperatures that allow low-temperature processing, and are derived from biomass materials such that final products are also eco-friendly biodegradable. Further, the PLA resins less shrink than olefin resins when they are cooled, and are transparent as well as readily dyed. Despite the above advantages, they are slowly solidified and prone to heat deformation due to low glass transition temperatures (Tg) and low crystallinities. Since they have an elongation of about 5% or less, they are poorly flexible and are prone to breakage. Further, the PLA resins may have insufficient mechanical properties such as impact strength and toughness. In order to overcome such shortcomings as described above, the PLA resins may need to be modified as desired.

It has been attempted to render the conventional PLA resins flexible by adding thereto a plasticizer or a chain extender or by further blending a rubbery component therewith, and to reinforce such physical properties as impact strength and toughness of the conventional PLA resins by adding various reinforcing agents thereto (see Chinese Patent Laid-Open Publication Nos. 103146164, 103467950, and 103087489). However, there is still a need for further improving the solidification rates of PLA resins required when they are processed and the flexibility of final products.

The present inventors have studied to provide a polylactic acid resin composition useful for 3D printing, with improved flexibility and thermal characteristics. As a result, a PLA resin copolymerized with a flexible component has been provided.

DISCLOSURE OF INVENTION

Technical Problem

Accordingly, an object of the present invention is to provide a polylactic acid resin composition useful for 3D printing, which can undergo low-temperature and high-speed processing, and has improved flexibility and thermal characteristics.

Another object of the present invention is to provide a PLA filament for 3D printing, comprising the polylactic acid resin composition.

A further object of the present invention is to provide a method of 3D printing using the polylactic acid resin composition.

Solution to Problem

In accordance with one aspect of the present invention, there is provided a polylactic acid resin composition for 3D printing, comprising (a) a hard segment comprising a polylactic acid repeat unit represented by Formula 1; and (b) a soft segment comprising a polyurethane polyol repeat unit in which polyether-based polyol repeat units represented by Formula 2 are linearly linked via urethane bonds, wherein the composition has a melting temperature of 170° C. or less, a glass transition temperature of 55° C. or less, a number-average molecular weight of 50,000 or more, and a viscosity of 1,000 Pa·s or less when measured at a temperature of 200° C. and at a shear rate of 100 s$^{-1}$:

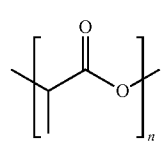

[Formula 1]

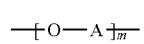

[Formula 2]

wherein n in Formula 1 is an integer ranging from 700 to 5,000; and, in Formula 2, A is a linear or branched alkylene group having 2 to 5 carbon atoms, and m is an integer ranging from 10 to 100.

In accordance with another aspect of the present invention, there is provided a PLA filament for 3D printing, comprising the polylactic acid resin composition.

In accordance with a further aspect of the present invention, there is provided a method of 3D printing using the polylactic acid resin composition.

Advantageous Effects

The polylactic acid resin composition according to the present invention has not only eco-friendly characteristics but also a low melting temperature and a low viscosity, compared with conventional polylactic acid resins, thereby allowing high-speed processing at low temperatures. Further, thanks to its high crystallization rate, the composition can be rapidly solidified upon printing. Consequently, the present invention significantly improves the processability and working environments of 3D printing.

BEST MODE

Hereinafter, the present invention will be described in more detail.

The polylactic acid resin composition for 3D printing according to the present invention comprises (a) a hard segment comprising a polylactic acid repeat unit represented by Formula 1; and (b) a soft segment comprising a polyurethane polyol repeat unit in which polyether-based polyol repeat units represented by Formula 2 are linearly linked via urethane bonds, wherein the composition has a melting temperature of 170° C. or less, a glass transition temperature of 55° C. or less, a number average molecular weight of 50,000 or more, and a viscosity of 1,000 Pa·s or less when measured at a temperature of 200° C. and at a shear rate of 100 s$^{-1}$:

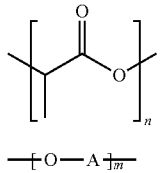
[Formula 1]

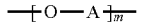
[Formula 2]

wherein n in Formula 1 is an integer ranging from 700 to 5,000; and, in Formula 2, A is a linear or branched alkylene group having 2 to 5 carbon atoms, and m is an integer ranging from 10 to 100.

In the polylactic acid resin composition according to the present invention, the polylactic acid repeat unit represented by Formula 1 comprised in the hard segment may be obtained by a conventional method for preparation of a polylactic acid homopolymer well known in the art. For instance, the above repeat unit may be obtained by preparing L-lactide or D-lactide, a cyclic dimer, from L-lactic acid or D-lactic acid, respectively, and then conducting ring-opening polymerization of L-lactide or D-lactide, or by a direct polycondensation of L-lactic acid or D-lactic acid. Among those, the ring-opening polymerization is preferable to provide the polylactic acid repeat unit in a higher degree of polymerization. Further, the polylactic acid repeat unit may be formed by copolymerizing L-lactide and D-lactide at a certain ratio so as to render the copolymer non-crystalline. In order to further enhance the heat resistance of the polylactic acid resin composition, however, the polylactic acid repeat unit is preferably prepared by homopolymerization of either L-lactide or D-lactide.

The polyurethane polyol repeat unit comprised in the soft segment has a structure in which the polyether-based polyol repeat units represented by Formula 2 are linearly linked via urethane bonds (—C(=O)—NH—). Specifically, the polyether-based polyol repeat unit refers to a polymer formed by ring-opening (co)polymerization of a monomer such as alkylene oxide, or a repeat unit constituting such polymer. The polyether-based polyol repeat unit may have hydroxyl groups at its terminal ends. This terminal hydroxyl group of the polyether-based polyol repeat unit may react with a diisocyanate compound to form a urethane bond, and the polyether-based polyol repeat units may be linearly linked via these urethane bonds to thereby form a polyurethane polyol repeat unit.

Since the polylactic acid resin composition according to the present invention comprises the polyurethane polyol repeat unit as a soft segment, it may have a lower melting temperature (Tm) and a lower glass transition temperature (Tg) than those of conventional polylactic acid resins, along with high flexibility and a high crystallization rate.

The polyether-based polyol repeat unit may be a polyether polyol (co)polymer prepared by ring-opening (co)polymerization of, e.g., one or more alkylene oxide monomers, or a repeat unit constituting this polymer. Examples of the alkylene oxide include ethylene oxide, propylene oxide, butylene oxide, tetrahydrofuran, and the like. Exemplary polyether-based polyol repeat unit prepared from the alkylene oxide is at least one selected from the group consisting of a polyethyleneglycol (PEG) repeat unit, a poly(1,2-propyleneglycol) repeat unit, a poly(1,3-propanediol) repeat unit, a polytetramethyleneglycol repeat unit, a polybutyleneglycol repeat unit, a repeat unit of a polyol formed by copolymerization of propylene oxide and tetrahydrofurane, a repeat unit of a polyol formed by copolymerization of ethylene oxide and tetrahydrofurane, and a repeat unit of a polyol formed by copolymerization of ethylene oxide and propylene oxide. For imparting flexibility to a polylactic acid resin and in light of its affinity to a polylactic acid repeat unit and moisture-containing capability, a repeat unit of poly(1,3-propanediol) or polytetramethylene glycol is preferred as the polyether-based polyol repeat unit. Further, the polyether-based polyol repeat unit may have a number average molecular weight of 400 to 9,000, preferably 1,000 to 3,000.

The diisocyanate compound, which reacts with the terminal hydroxyl groups of the polyether-based polyol repeat unit to form a urethane bond, may be any compound that has two isocyanate groups in its molecule. For example, the diisocyanate compound is at least one selected from the group consisting of 1,6-hexamethylene diisocyanate, 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-bisphenylene diisocyanate, isophorone diisocyanate, and hydrogenated diphenylmethane diisocyanate. In addition, other various diisocyanate compounds well known in the art may be used without particular limitations. For imparting flexibility to a polylactic acid resin, 1,6-hexamethylene diisocyanate is preferred.

Meanwhile, the polylactic acid resin composition according to one embodiment of the present invention may comprise a block copolymer prepared by copolymerization of the hard segment and the soft segment. Specifically, the block copolymer may have a structure in which a polylactic acid repeat unit in the hard segment is coupled with a polyurethane polyol repeat unit in the soft segment. More specifically, a terminal carboxyl group of the polylactic acid repeat unit may be linked to a terminal hydroxyl group of the polyurethane polyol repeat unit through an ester bond. For instance, the chemical structure of the block copolymer may be represented by general formula 1:

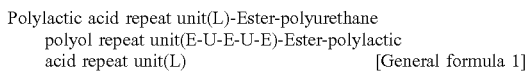

Polylactic acid repeat unit(L)-Ester-polyurethane polyol repeat unit(E-U-E-U-E)-Ester-polylactic acid repeat unit(L)     [General formula 1]

wherein E represents a polyether-based polyol repeat unit, U represents a urethane bond, and Ester represents an ester bond.

All of the polylactic acid repeat units comprised in the polylactic acid resin composition are not necessarily coupled with the polyurethane polyol repeat units to form the block copolymer; instead, at least some of the polylactic acid repeat units may remain as a polylactic acid homopolymer without being coupled with the polyurethane polyol repeat unit. In this case, the polylactic acid resin composition may be provided in the form of a mixture comprising the block copolymer and the polylactic acid repeat units that are not coupled with the polyurethane polyol repeat units, i.e., as a polylactic acid homopolymer.

Further, the polylactic acid resin composition of the present invention may comprise about 65 to 95% by weight ('wt. %) of the hard segment and about 5 to 35 wt. % of the soft segment, based on the total weight (i.e., weight of the block copolymer or, if the polylactic acid homopolymer is optionally present, a sum of weights of this homopolymer as well as the block copolymer). Preferably, the polylactic acid resin composition may comprise (i) about 80 to 95 wt. % of the hard segment and about 5 to 20 wt. % of the soft segment; (ii) about 82 wt. % to 92 wt. % of the hard segment and about 8 to 18 wt. % of the soft segment; or (iii) about 85 to 90 wt. % of the hard segment and about 10 to 15 wt. % of the soft segment.

If the content of the soft segment is 35 wt. % or less, a polylactic acid resin having a high molecular weight may be provided, which may produce a product having good mechanical properties such as strength. Further, if the content of the soft segment is 5 wt. % or more, a polylactic acid resin and a product prepared therefrom may preferably have improved flexibility. Especially, in this case, the polylactic acid resin has a desirable glass transition temperature, to thereby enhance the flexibility of a product prepared therefrom. Further, since a polyurethane polyol repeat unit in the soft segment properly serves as an initiator, the polymerization conversion may be improved, and the polylactic acid resin may have a high molecular weight.

Meanwhile, the polylactic acid resin composition of the present invention may further comprise any of various additives selected from the group consisting of an antioxidant, a reinforcing agent, and a combination thereof.

For instance, the polylactic acid resin composition may further comprise an antioxidant (or a stabilizer) in order to prevent oxidation or thermal decomposition of the soft segment in a manufacturing process. The antioxidant may be at least one selected from the group consisting of a hindered phenol antioxidant, an amine antioxidant, a thio antioxidant, and a phosphate antioxidant. These antioxidants are well known in the art. The antioxidant used in the present invention may be present in an amount of 100 to 3,000 ppmw relative to the total weight of monomers used for forming repeat units of the polylactic acid resin composition.

The polylactic acid resin composition may further comprise a reinforcing agent to improve its anti-blocking property or the like. Examples of the reinforcing agent may include at least one selected from the group consisting of silica, colloidal silica, alumina, alumina sol, talc, mica, and calcium carbonate. Specific kinds or purchase routes of the reinforcing agent are well known to those skilled in the art.

Moreover, the polylactic acid resin composition may further comprise any other additives used in 3D printing, for example, plasticizers, UV stabilizers, anti-coloring agents, mat finishing agents, deodorizers, flame retardants, weatherproofing agents, antistatic agents, releasing agents, antioxidants, ion-exchangers, coloring pigments, inorganic or organic particles, or the like, as long as the composition is not adversely affected. Specific kinds or purchase routes of these additives are well known to those skilled in the art.

Examples of the plasticizer include phthalic acid ester-based plasticizers such as diethyl phthalate, dioctyl phthalate, dicyclohexyl phthalate, and the like; aliphatic dibasic acid ester-based plasticizers such as di-1-butyl adipate, di-n-octyl adipate, di-n-butyl sebacate, di-2-ethylhexyl azelate, and the like; phosphoric acid ester-based plasticizers such as diphenyl 2-ethylhexyl phosphate, diphenyl octyl phosphate, and the like; polyhydroxy carbonic acid ester-based plasticizers such as acetyl tributyl citrate, acetyl tri-2-ethylhexyl citrate, tributyl citrate, and the like; fatty acid ester-based plasticizers such as methyl acetyl ricinoleate, amyl stearate, and the like; polyhydric alcohol ester-based plasticizers such as glycerin triacetate, and the like; and epoxy-based plasticizers such as epoxidized soybean oil, epoxidized butyl esters of linseed oil fatty acids, epoxy octyl stearate, and the like.

Examples of the coloring pigment may include inorganic pigments such as carbon black, titanium oxide, zinc oxide, iron oxide, and the like; and organic pigments such as cyanines, phosphorous, quinones, perinones, isoindolinones, and thioindigos.

Examples of the inorganic or organic particles may include polystyrene, polymethyl methacrylate, silicon, and the like.

The polylactic acid resin composition according to the present invention, for example, the block copolymer comprised therein may have a number-average molecular weight (Mn) of 50,000 or more, preferably about 50,000 to 200,000, and more preferably about 50,000 to 150,000.

Further, the polylactic acid resin composition may have a weight-average molecular weight of about 100,000 to 500,000, and preferably about 100,000 to 320,000. Such molecular weights may have impacts upon the processability or mechanical properties of the polylactic acid resin composition.

If the molecular weight is too small (for example, an Mw of less than 100,000), the melt viscosity of the composition may be too low in a melting process such as extrusion for 3D printing, resulting in deterioration in the processability of the composition as well as in the mechanical properties of the composition such as strength. In contrast, if the molecular weight is too large (for example, an Mw of more than 500,000), the melt viscosity of the composition may be too high in a melting process, thereby considerably reducing the productivity of the process.

The polylactic acid resin composition according to the present invention, for example, the block copolymer comprised therein may have a molecular weight distribution defined as a ratio (Mw/Mn) of weight-average molecular weight (Mw) to number-average molecular weight (Mn), which may range from about 1.60 to 2.30, and preferably from about 1.80 to 2.20.

As the polylactic acid resin composition has a molecular weight distribution falling within the above ranges, it may have a proper melting temperature and melting properties in a melting process such as extrusion, resulting in excellent extrudability and processability for a 3D printed product. Further, a product prepared from the polylactic acid resin composition may have excellent mechanical properties, e.g., high strength. On the other hand, if the molecular weight distribution is too narrow, the melt viscosity of the composition at processing temperatures for extrusion or the like is excessively high, thereby causing a problem in a process to form a 3D printed product. In contrast, if the molecular weight distribution is too broad, the mechanical properties may be impaired or the melting characteristics are deteriorated, e.g., resulting in a very low viscosity. As a result, it may be difficult to 3D print a product, or the quality of the 3D printed product may be poor.

Further, the polylactic acid resin composition according to the present invention may have a melting temperature (Tm) of 170° C. or less, preferably about 145 to 170° C., and more preferably about 150 to 170° C.

If the melting temperature is within the above range, the polylactic acid resin composition can undergo a melt process such as extrusion with a proper melt viscosity at low temperatures, compared with conventional polylactic acid resins, thereby enhancing its processability to form a product.

Further, the polylactic acid resin composition according to the present invention may have a glass transition temperature (Tg) of 55° C. or less, preferably about 25 to 55° C., and more preferably about 35 to 55° C.

Since the polylactic acid resin composition of the present invention has a melting temperature and a glass transition temperature in the above ranges, it can undergo a melting process at low temperatures for 3D printing, compared with conventional polylactic acid resins. In addition, it can be subjected to high-speed processing. Further, the optimized flexibility of the resin enhances its crystallization rate, giving rise to a crystallization temperature (Tc) ranging from about 85 to 110° C., which was not observed in thermal analyses of conventional polylactic acid resins. As a result, the resin composition can be rapidly solidified, thereby greatly improving the 3D printing speed. In this regard, it is noted that the conventional polylactic acid resins are not readily crystallized due to the mobility problems of polymer chains. In contrast, in the polylactic acid resin composition of the present invention, the soft segment comprised in the copolymer secures the mobility of polymer chains, thereby facilitating crystallization of the resin composition.

It is also important in the preparation of the polylactic acid resin composition satisfying the above glass transition temperature requirement to properly control the molecular weight of the polyether-based polyol polymer or the amount of the polymer having polyurethane polyol repeat units responsible for the soft segment. Further, it is possible to prepare the polylactic acid resin composition satisfying the above glass transition temperature and melting temperature requirements by adjusting the optical purity of L-lactide or D-lactide, two optical isomers of lactide, to, for example, about 98% or more, preferably about 99% or more, and most preferably about 99.5% or more.

The polylactic acid resin composition according to the present invention may have a viscosity of 1,000 Pa·s or less, preferably 50 to 900 Pa·s, and more preferably 80 to 850 Pa·s, when measured at a temperature of 200° C. and at a shear rate of 100 s$^{-1}$. Such a low viscosity characteristic, compared with conventional polylactic acid resins, may allow low-temperature and high-speed processing for 3D printing, while improving processability and productivity.

Meanwhile, the polylactic acid resin composition according to the present invention is eco-friendly since it may have a biomass-based organic carbon content (% $C_{bio}$), represented by Equation 1, of about 60% or more, about 70% or more, about 80% or more, about 85% or more, about 90% or more, or about 95% or more.

% $C_{bio}$=[weight ratio of $^{14}$C isotope to $^{12}$C isotope of carbon atoms in a polylactic acid resin]/ [weight ratio of $^{14}$C isotope to $^{12}$C isotope of carbon atoms in a biomass-based standard material]×100    [Equation 1]

Biomass-based organic carbon contents according to Equation 1 may be measured by a procedure in accordance with the ASTM D6866 standard.

Hereinafter, a method for preparation of the polylactic acid resin composition for 3D printing according to the present invention will be described in more detail.

First, a (co)polymer having a polyether-based polyol repeat unit is formed by ring-opening (co)polymerization of at least one monomer such as alkylene oxide. This may be conducted according to any conventional process for preparation of a polyether-based polyol (co)polymer.

Then, the (co)polymer having a polyether-based polyol repeat unit, a diisocyanate compound, and a urethane reaction catalyst are charged in a reactor, followed by heating and agitating the mixture to carry out a urethane reaction. In this reaction, each of the two isocyanate groups in the diisocyanate compound is coupled with a terminal hydroxyl group in the (co)polymer to form a urethane bond. As a result, a (co)polymer having a polyurethane polyol repeat unit, in which the polyether-based polyol repeat units are linearly linked via urethane bonds, may be formed and serve as a soft segment in the polylactic acid resin composition. In this case, the polyurethane polyol (co)polymer may be in the form of E-U-E-U-E in which the polyether-based polyol repeat units (E) are linearly linked via urethane bonds (U) with the polyether-based polyol repeat units at both terminal ends.

The alkylene oxide and the polyether-based polyol repeat units prepared therefrom may be derived from a biomass material such as a plant resource. Therefore, the polyurethane polyol (co)polymer may have a biomass-based organic carbon content (% $C_{bio}$) of about 60% or more, and preferably about 70% or more.

The urethane reaction may be carried out in the presence of typical tin catalysts, for example, tin 2-ethylhexanoate (or stannous octoate), dibutyltin dilaurate, dioctyltin dilaurate, etc. Further, the urethane reaction may be conducted under typical reaction conditions for preparing a polyurethane resin. For example, a diisocyanate compound and a polyether-based polyol (co)polymer are admixed in a nitrogen atmosphere and then a urethane reaction catalyst is introduced into the mixture to perform a reaction at a reaction temperature of 70 to 80° C. for 1 to 5 hours, thereby preparing a (co)polymer having a polyurethane polyol repeat unit.

Meanwhile, the ring-opening polymerization of lactide may be performed in the presence of a metal catalyst including, for example, an alkaline earth metal, a rare earth metal, a transition metal, aluminum, germanium, tin, antimony, etc. Specifically, such a metal catalyst may be in the form of carboxylates, alkoxylates, halides, oxides, or carbonates of the above metal. Preferred metal catalysts may be tin 2-ethylhexanoate, titanium tetraisopropoxide, aluminum triisopropoxide, etc. Further, an antioxidant may be used along with this catalyst to produce a polylactic acid resin composition with reduced yellowing and excellent appearance.

Further, the formation of a polylactic acid repeat unit through the ring-opening polymerization of lactide may be subsequently carried out in the same reactor in which the urethane reaction has been conducted. That is, a polyether polyol polymer and a diisocyanate compound are subjected to a urethane rejection to yield a polymer having a polyurethane polyol repeat unit, and a monomer such as lactide and a catalyst may be subsequently added to the same reactor to produce a polylactic acid repeat unit. As a result, the polymer having a polyurethane polyol repeat unit may function as an initiator, which allows continuous production of a polylactic acid repeat unit and a polylactic acid resin comprising same in high yields and productivity.

The polylactic acid resin composition as prepared above comprises a block copolymer in which specific hard segments and soft segments are combined; therefore, it may be biodegradable, which is attributable to the polylactic acid resin, while having enhanced flexibility. Also, the resin composition shows reduced bleed-out of the soft segment that is responsible for flexibility. The soft segment comprised in the resin composition may allow low-temperature processing of the composition at high efficiency, compared with conventional polylactic acid resins. Also, the composition can undergo high-speed processing and improve the processability of 3D printing due to its improved solidification rates attributable to high crystallization rates.

In accordance with the present invention, there is provided a method of 3D printing using a polylactic acid resin composition, which comprises (a) a hard segment comprising a polylactic acid repeat unit represented by Formula 1; and (b) a soft segment comprising a polyurethane polyol repeat unit in which polyether-based polyol repeat units represented by Formula 2 are linearly linked via urethane bonds, wherein the composition has a melting temperature of 170° C. or less, a glass transition temperature of 55° C. or less, a number-average molecular weight of 50,000 or more, and a viscosity of 1,000 Pa·s or less when measured at a temperature of 200° C. and at a shear rate of 100 s$^{-1}$:

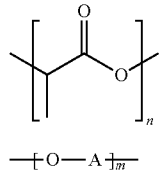

[Formula 1]

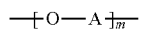

[Formula 2]

wherein n in Formula 1 is an integer ranging from 700 to 5,000; and, in Formula 2, A is a linear or branched alkylene group having 2 to 5 carbon atoms, and m is an integer ranging from 10 to 100.

Further, in accordance with the present invention, there is provided a PLA filament for 3D printing, comprising the polylactic acid resin composition.

The PLA filament for 3D printing may be fabricated by drying the polylactic acid resin composition under reduced pressures and then extruding same according to a conventional method for preparing a filament.

According to one embodiment, the polylactic acid resin composition of the present invention is dried under reduced pressures, is mixed with an inorganic filler and an additive such as an antioxidant, and is then melt extruded at temperatures of 190 to 220° C. into a strand form. The extruder used herein may be a single-screw extruder or a twin-screw extruder equipped with any of various compounding apparatuses such as a roll mill, a kneader, a Banbury mixer, etc. Thereafter, the extruded strand is cooled through a water bath and wound around a bobbin in a certain weight as a PLA filament for 3D printing. The diameter of the filament may vary with the type of a 3D printer, but may, in general, range from 1.75 mm to 3 mm.

Since the polylactic acid resin composition of the present invention and a filament comprising same comprise specific hard segments and soft segments, they may have a desired glass transition temperature and a desired melting temperature, thereby having optimum flexibility and stiffness for 3D printing. In addition, they may have improved melt processability and heat resistance. Accordingly, the polylactic acid resin composition of the present invention may be particularly appropriate for 3D printing. Further, since the polylactic acid resin composition of the present invention and a filament comprising same may have high biomass-based organic carbon contents, they are biodegradable and thus eco-friendly.

MODE FOR THE INVENTION

Hereinafter, the present invention will be described in detail by the following examples. However, these examples are provided for the purpose of illustrating the present invention, but not limiting the scope of the present invention.

Definition and Measurement of Physical Properties

In the following examples, physical properties are defined and measured, as follows.

(1) Mw and Mn (g/mol), and molecular weight distribution (Mw/Mn): measured by dissolving a polylactic acid resin composition in chloroform in a concentration of 0.25 wt. %, which was subjected to gel permeation chromatography (Viscotek TDA 305, column: Shodex LF804×2 ea) using polystyrene as a standard material. A molecular weight distribution (MWD) was calculated from the measured Mw and Mn.

(2) Glass transition temperature (Tg), melting temperature (Tm), and crystallization temperature (Tc) were measured using a differential scanning calorimeter (DSC, TA Instruments) wherein a sample was heated from 30° C. to 250° C. at a rate of 20° C./min, cooled to 0° C. at a rate of 20° C./min or 5° C./min, and then heated again to 250° C. at a rate of 10° C./min.

Tg (° C.): determined from the median value of a base line near the endothermic curve and each tangential line.

Tm (° C.): determined from the maximum value of the melting endothermic peak of crystals.

Tc (° C.): determined from the maximum value of the melting exothermic peak of crystals. Here, an exothermic temperature during cooling of the sample at a constant rate was measured as a melt crystallization temperature (Tmc), and an exothermic temperature during heating of the quenched sample at a constant rate was measured as a cold crystallization temperature (Tcc).

(3) Content of polyurethane polyol repeat unit (wt. %): measured using a 600 MHz nuclear magnetic resonance (NMR) spectrometer for each polylactic acid resin composition.

(4) Viscosity (Pa·s): measured using a rheometer (Anton Paar) at a temperature of 200° C. and at a shear rate of 100 $s^{-1}$.

(5) Organic carbon content: measured according to ASTM D6866.

Raw Materials Used in Examples and Comparative Examples:

(1) Polyether-based polyol repeat unit
 PPDO 2.4: poly(1,3-propanediol); number-average molecular weight of 2,400
 PPG: polypropyleneglycol; number-average molecular weight of 2,000
(2) Diisocyanate compound
 HDI: 1,6-hexamethylene diisocyanate
(3) Lactide monomer
 L-lactide or D-lactide: manufactured by Purac Co., optical purity of 99.5% or more
(4) Antioxidant or the like
 U626: bis(2,4-di-t-butylphenyl)pentaerythritol diphosphite
 I-1076: octadecyl 3-(3,5-di-t-butyl-4-hydroxyphenylpropionate Examples 1 to 4: Preparation of Polylactic Acid Resin Compositions (Resins A to D)

Reactants as indicated in Table 1 below and a catalyst were charged in an 8 L reactor equipped with a nitrogen gas inlet, a stirrer, a catalyst inlet, an effluent condenser, and a vacuum system. Added to the reactor as the catalyst was dibutyltin dilaurate in a concentration of 130 ppmw relative to the total weight of the reactants.

Under a nitrogen atmosphere, a urethane reaction was performed at a reactor temperature of 70° C. for 2 hours. Then, 4 kg of L-(or D-)lactide were added, followed by nitrogen flushing five times. Thereafter, L-(or D-)lactide was completely dissolved by raising the temperature to 150° C., and tin 2-ethylhexanoate diluted in 500 mL toluene in a concentration of 120 ppmw, relative to the total weight of the reactants, was fed through the catalyst inlet to the reactor.

Under 1 kg of nitrogen pressure, a reaction was performed at 185° C. for 2 hours, and 200 ppmw of phosphoric acid were added through the catalyst inlet, followed by mixing for 15 minutes to deactivate the residual catalyst. Then, a vacuum was applied till the pressure reached 0.5 torr in order to remove unreacted L-(or D-)lactide (about 5 wt. % of the initially charged amount). Tm, Tg, Tc, and viscosity of the resin composition thus obtained were measured and shown in Table 1.

Examples 5 and 6: Preparation of Polylactic Acid Compounding Resin Compositions (Resins E and F)

Each of the polylactic acid resin compositions prepared in Examples 1 and 3 (Resins A and C) was dried under a reduced pressure of 1 torr at 80° C. for 6 hours. An inorganic filler of talc (SP 3000, Dawon Chemical) in a concentration of 10 wt. % was added to the polylactic acid resin composition, and 100 ppm of the antioxidant used in Examples 1 and 3 were also added thereto, followed by mixing of the composition in a super mixer. The composition was then extruded through a twin-screw extruder having a diameter of 19 mm at 190 to 220° C. to a strand form. The extruded strand was cooled in a water bath and cut into chips in a pelletizer. The chips were dried in a dehumidifying dryer or hot-air dryer at 80° C. for 4 hours. Tm, Tg, Tc, and viscosity of the resin composition thus obtained were measured and shown in Table 1.

Comparative Example 1: Preparation of Polylactic Acid Resin Compound (Resin G)

1-Dodecanol, L-lactide, and an antioxidant as indicated in Table 1 below were charged in a 8 L reactor equipped with a nitrogen gas inlet, a stirrer, a catalyst inlet, an effluent condenser, and a vacuum system, followed by nitrogen flushing five times. Thereafter, L-lactide was completely dissolved by raising the temperature to 150° C., and tin 2-ethylhexanoate diluted in 500 mL toluene in a concentration of 120 ppmw, relative to the total weight of the reactants, was fed through the catalyst inlet to the reactor.

Under 1 kg of nitrogen pressure, a reaction was performed at 185° C. for 2 hours, and 200 ppmw of phosphoric acid were added through the catalyst inlet, followed by mixing for 15 minutes to deactivate the residual catalyst. Then, a vacuum was applied till the pressure reached 0.5 torr in order to remove unreacted L-lactide. Tm, Tg, Tc (Tmc and Tcc), and viscosity of the resin composition were measured and shown in Table 1.

TABLE 1

|  | Example 1 Resin A | Example 2 Resin B | Example 3 Resin C | Example 4 Resin D | Example 5 Resin E | example 6 Resin F | Comparative Example 1 Resin G |
|---|---|---|---|---|---|---|---|
| L-lactide (g) | 4000 | | | 4000 | | | 4000 |
| D-lactide (g) | | 4000 | 4000 | | | | |
| PPDO 2.4 (g) | 419 | 942 | | | | | |
| PPG (g) | | | 414 | 931 | | | |
| HDI (g) | 24.7 | 57.4 | 30.3 | 68.1 | | | |
| 1-dodecanol (g) | | | | | | | 11 |
| Polyurethane polyol repeat unit (wt %) | 10% | 20% | 10% | 20% | | | 0% |
| U626 (g) | 2 | 2 | 2 | 2 | 4 | 4 | 2 |
| I-1076(g) | 2 | 2 | 2 | 2 | | | 2 |
| Used resin | | | | | Resin A | Resin C | |
| Amount of resin used (g) | | | | | 3600 | 3600 | |
| Talc (g) | | | | | 400 | 400 | |
| Mn (×1000, g/mol) | 87 | 85 | 98 | 93 | 85 | 95 | 126 |

TABLE 1-continued

|  | Example 1 Resin A | Example 2 Resin B | Example 3 Resin C | Example 4 Resin D | Example 5 Resin E | example 6 Resin F | Comparative Example 1 Resin G |
|---|---|---|---|---|---|---|---|
| Mw (×1000, g/mol) | 190 | 180 | 215 | 205 | 185 | 208 | 256 |
| MWD | 2.18 | 2.12 | 2.19 | 2.20 | 2.18 | 2.19 | 2.03 |
| Organic carbon content (%) | 98.2 | 98.2 | 88.5 | 79.8 | 80.5 | 80.3 | 98.8 |
| Tg (° C.) | 43 | 38 | 43 | 35 | 42 | 43 | 65 |
| Tm (° C.) | 166 | 163 | 165 | 160 | 167 | 168 | 179 |
| Tc (° C.) Tcc | 91 | 93 | 103 | 105 | — | — | Not measured |
| Tmc | — | — | — | — | 110 | 107 |  |
| Viscosity (Pa. s) | 602 | 598 | 87.7 | 85.4 | 834 | 829 | 1150 |

As shown in Table 1, each of the polylactic acid resin compositions prepared in Examples 1 to 6 had a weight-average molecular weight of 100,000 to 300,000, a Tg of 35 to 50° C., a Tm of 160 to 170° C., and a Tc of 80 to 110° C. On the other hand, the conventional polylactic acid resin composition prepared in Comparative Example 1 had a relatively high Tm of 179° C. and a relatively high Tg of 65° C., but no Tc was measured.

Whether a Tc of a PLA resin is observed, and its value if observed, may serve as a standard for assessing a crystallization rate. If the crystallization rate is high, crystallization may occur during cooling or heating such that Tmc or Tcc is observed. As a result of cooling at a rate of 20° C./min and then heating, Tcc was observed in the resin compositions prepared in Examples 1 to 4, and Tmc was observed in the resin compositions prepared in Examples 5 and 6. Further, when the cooling rate was changed to 5° C./min, a Tmc peak (112.5° C.) was still observed in the resin composition prepared in Example 1. In contrast, no Tc peak was observed in the resin composition prepared in Comparative Example 1 in the DSC analysis due to its low crystallization rate.

It is confirmed from the above that the polylactic acid resin compositions of the present invention had high crystallization rates and low Tm values, compared with conventional polylactic acid resins, such that they can undergo extrusion at temperatures of 180 to 200° C. It is difficult that the conventional polylactic acid resins are crystallized due to mobility problems of polymer chains, whereas the soft segment comprised in the copolymer of the resin compositions according to the present invention renders polymer chains mobile, thereby facilitating crystallization thereof.

Further, each of the resin compositions prepared in Examples 1 to 6 had a viscosity of 1,000 Pa·s or less, when measured at 200° C. and a shear rate of 100 s$^{-1}$, while the resin composition prepared in Comparative Example 1 had a viscosity far exceeding 1,000 Pa·s.

Accordingly, the polylactic acid resin composition according to the present invention has a high crystallization rate, a low Tm, and a low viscosity, compared with conventional polylactic acid resins. Therefore, the inventive resin composition can undergo low-temperature and high-speed processing for 3D printing, and is appropriate as a material for 3D printing due to its high solidification rates.

Preparative Example of PLA Filament for 3D Printing

Each of the polylactic acid resin compositions prepared in Examples 1 to 6 was dried under reduced pressures, an inorganic filler of talc (SP 3000, Dawon Chemical) was added thereto in an amount of 1 to 30 wt. %, and then U626 and 1-1076 as an antioxidant were added thereto, followed by mixing the composition in a super mixer. The composition was then extruded through a twin-screw extruder having a diameter of 19 mm into a strand form at temperatures of 190 to 220° C. Next, the extruded strand was cooled in a water bath and wound around a bobbin in a certain weight as a PLA filament for 3D printing having a diameter of 1.75 mm or 3 mm.

What is claimed is:

1. A polylactic acid resin composition for three-dimensional (3D) printing, comprising:
   (a) a hard segment comprising a polylactic acid repeat unit represented by Formula 1; and (b) a soft segment comprising a polyurethane polyol repeat unit in which polyether-based polyol repeat units represented by Formula 2 are linearly linked via urethane bonds,
   wherein the composition has a melting temperature of 170° C. or less, a glass transition temperature of 55° C. or less, a number-average molecular weight of 50,000 or more, and a viscosity of 1,000 Pas or less when measured at a temperature of 200° C. and at a shear rate of 100 s$^{-1}$:

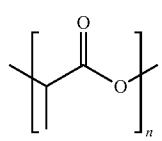

[Formula 1]

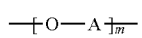

[Formula 2]

wherein n in Formula 1 is an integer ranging from 700 to 5,000; and, in Formula 2, A is a linear or branched alkylene group having 2 to 5 carbon atoms, and m is an integer ranging from 10 to 100.

2. The composition according to claim 1, wherein the composition comprises (a) the hard segment in an amount of 65 to 95% by weight and (b) the soft segment in an amount of 5 to 35% by weight, relative to the total weight of the composition.

3. The composition according to claim 1, wherein the polyether-based polyol repeat unit is at least one selected from the group consisting of a polyetherglycol (PEG) repeat unit, a poly(1,2-propyleneglycol) repeat unit, a poly(1,3-propanediol) repeat unit, a polytetramethyleneglycol repeat unit, a polybutyleneglycol repeat unit, a repeat unit of a polyol formed by copolymerization of propylene oxide and tetrahydrofurane, a repeat unit of a polyol formed by copolymerization of ethylene oxide and tetrahydrofurane, and a repeat unit of a polyol formed by copolymerization of ethylene oxide and propylene oxide.

4. The composition according to claim 1, wherein the urethane bond is formed by a reaction between a terminal hydroxyl group in the polyether-based polyol repeat unit and a diisocyanate compound.

5. The composition according to claim 4, wherein the diisocyanate compound is at least one selected from the group consisting of 1,6-hexamethylene diisocyanate, 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-bisphenylene diisocyanate, isophorone diisocyanate, and hydrogenated diphenylmethane diisocyanate.

6. The composition according to claim 1, further comprising at least one additive selected from the group consisting of a hindered phenol antioxidant, an amine antioxidant, a thio antioxidant, a phosphite antioxidant, silica, colloidal silica, alumina, alumina sol, talc, mica, and calcium carbonate.

7. A polylactic acid filament for 3D printing, comprising the polylactic acid resin composition according to claim 1.

8. A method of 3D printing using a polylactic acid resin composition, which comprises: (a) a hard segment comprising a polylactic acid repeat unit represented by Formula 1; and (b) a soft segment comprising a polyurethane polyol repeat unit in which polyether-based polyol repeat units represented by Formula 2 are linearly linked via urethane bonds, wherein the composition has a melting temperature of 170° C. or less, a glass transition temperature of 55° C. or less, a number-average molecular weight of 50,000 or more, and a viscosity of 1,000 Pas or less when measured at a temperature of 200° C. and at a shear rate of 100 s$^{-1}$:

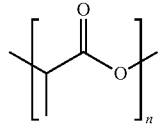

[Formula 1]

[Formula 2]

wherein n in Formula 1 is an integer ranging from 700 to 5,000; and, in Formula 2, A is a linear or branched alkylene group having 2 to 5 carbon atoms, and m is an integer ranging from 10 to 100.

* * * * *